United States Patent Office 3,028,245
Patented Apr. 3, 1962

3,028,245
TREATMENT OF EGG MATERIAL
Leon D. Mink, Chicago, and John H. Silliker,
Park Forest, Ill.
No Drawing. Filed Feb. 10, 1958, Ser. No. 714,067
10 Claims. (Cl. 99—210)

This invention relates generally to treatment of egg material and more particularly to a method of preparing commercially sterile dried egg products.

The egg industry in recent years has made considerable progress in the improvement of the functional properties of dried egg products. Along with these improvements in the functional properties have come new uses and more rigid specifications. These specifications include very strict bacteriological standards when the dried products are to be used in food products. The egg industry has been long searching for a means for cold sterilization of egg materials. By cold sterilization we mean the destruction of at least 99.99+% of the visible microorganisms at temperatures too low to be considered to have any lethal effect upon the microorganisms according to standards used in pasteurization. Cold sterilization has a very important effect upon the physical properties of various materials especially those organic in nature which might be adversely affected by heat, such as protein containing products. We have found that hydrogen peroxide is a very effectual bacetericidal agent for egg products at temperatures within the range of 30–60° F.

Prior workers have disclosed that hydrogen peroxide might be used in food products as a bactericidal agent if the food product was heated to temperatures above 100° F. either in the presence or absence of enzymes. Quite unexpectedly we found that contrary to these prior art teachings, hydrogen peroxide is a very effective bactericidal agent for egg materials when used at low temperatures. It is possible to obtain commercial sterility of the egg material when the treatment of the egg material with hydrogen peroxide at low temperatures is combined with a drying step to yield a dried product.

U.S. Patent No. 779,637 to Budde illustrates the use of hydrogen peroxide in foods generally. U.S. Patent No. 2,776,214 to Lloyd et al. illustrates the treatment of liquid egg whites with hydrogen peroxide for the reduction of the bacterial population of the products. These patents illustrate the necessity of using temperatures above 100° F. before there is any bactericidal effect upon the product. The methods disclosed by these patents have the disadvantage of increasing the cost of the processed product due to the power requirements of heating the product as well as additional processing steps, loss of product, and longer processing times. Further, additional materials are required to be present while the product is heated, or certain materials must be destroyed, such as catalase enzyme by a separate heat treatment prior to the treatment with the hydrogen peroxide. When we attempted to follow the teachings of the prior art, we were unable to satisfactorily practice them without substantial loss of product. For example, a loss resulted from excessive foaming of the egg materials when the hydrogen peroxide was added thereto at the elevated temperatures. Also, in order to obtain substantial sterilization, there is often a sacrifice of functional properties of the dried product.

A principal object of this invention is to provide an improved method by which egg materials can be treated in such a manner that the functional property of the dried egg material is not impaired and that the dried products are substantially free of viable microorganisms.

Other objects and further scope of applicability of the present invention will become apparent from the detailed description given hereinafter. It should be understood, however, that the detailed description and specific examples while indicating preferred embodiments of the invention are given by way of illustration only since various changes and modifications within the spirit and scope of the invention will become apparent to those skillled in the art.

In accordance with the invention the liquid egg material is treated with hydrogen peroxide at temperatures which minimize foaming and at concentrations which have a bactericidal effect upon the bacterial population of the raw liquid egg material. When the treated liquid egg material is subsequently dried, bacteriological analyses of the dried material reveal that there has been a destruction of the initial viable microorganisms in excess of 99.99+%, thereby producing a product which is classified as commercially sterile.

It has been found that a minimum quantity of 0.05% hydrogen peroxide is sufficient to destroy at least 95% of the microorganisms initially present in the egg material containing catalase, indigenous or added during desugaring operations. The upper limit of the quantity of hydrogen peroxide that will effectively produce a substantially sterile dried egg material is dictated by price and not by the physical reaction in the product. We have found that the preferable range of the amount of hydrogen peroxide to use in the treatment of a liquid egg material is within the range of 0.2% to 0.8% by weight of the liquid egg material. Temperatures within the range of 30 to 60° F. may be used. The preferable temperature range is between the temperatures of 40 and 55° F. After a short contact time of the hydrogen peroxide with the liquid egg material the product is then dried.

Drying may be accomplished by any of the conventional drying methods for egg materials. Dependent upon the type of operation that the egg processor would be using, the liquid egg material may be optionally preheated prior to the drying. For example, in the spray drying of liquid egg whites, it may be preferable to preheat the liquid material to a maximum temperature of 130° F. and use a lower inlet temperature for the drying air. Or, if the egg manufacturer wishes to disregard the intermediate preheating of the liquid egg white, he can go directly from the treating vat to the spray dryer. In the latter case it would be necessary that the air inlet temperature be much higher than when the eggs are preheated between the treating vat and the dryer. The preheating is only incidental to our process and is only for lowering the temperature of the drying air and does not contribute to the bactericidal effect produced by the hydrogen peroxide treatment of this invention.

The combination of the admixing of hydrogen peroxide with liquid egg material at temperatures within the range of 30 to 60° F. and the drying of the liquid treated egg material with or without intermediate heat treatment yields a substantially sterile dried egg material. In the foam drying method disclosed in U.S. Patent No. 2,200,963 to L. D. Mink, wherein the liquid egg material is whipped to a foam and then distributed in forms of strands onto a moving conveyor passing through an air tunnel dryer, the egg whites are not preheated prior to whipping and drying. The instant invention permits the production of substantially sterile dried egg whites in accordance with the Mink patent.

Generally, egg materials that are to be dehydrated have the sugar removed prior to drying. The purpose of the removal of the suggar is to extend the shelf life of the dried egg product. The instant invention has an extreme beneficial effect when used with desugared materials. Any conventional desugaring process, such as bacterial or yeast fermentation, or an enzymatic desugaring system, may be used, the only requirement being that the liquid desugared egg material be cooled to a temperature less than 60° at the time the hydrogen peroxide is admixed therewith. The term "fluff drying" as used in the specification and claims denotes the process that is described in U.S. Patent No. 2,200,963 to L. D. Mink. It is desirable to use a continuous automatic mixer in the system of the Mink patent, wherein the liquid egg white is pumped to a mixing chamber and air introduced into the liquid egg material under pressure.

EXAMPLE I

Eight thousand pounds of freshly separated egg white were placed in a vat, warmed to 95° F. and desugared by bacterial fermentation. The desugared liquid was then cooled to 45° F., and thereafter divided into five portions of approximately 1600 pounds each. The desugared liquid egg whites had a total count of 3,600,000 per gram and a coliform count of 300,000 per gram prior to hydrogen peroxide treatment. In Table I below the respective lots are designated A-E. Lot A was used as the control and was not treated with hydrogen peroxide. As each lot was transferred from the holding supply vat by pumping to the continuous automatic mixer wherein the egg whites were whipped to a foam, hydrogen peroxide was added by means of a metering pump to the inlet side of the pump feeding the continuous mixer in amounts as indicated in Table I to give the respective quantities by weight based upon the liquid egg material. After whipping the egg whites were distributed in the form of strands of foam upon a traveling conveyor belt and then dried.

*Table I*

| Lot No. | Percent $H_2O_2$ By Weight | Standard Plate Count Per Gram | | | |
|---|---|---|---|---|---|
| | | Of Foam from Distributors | | Of Powder from Dryer | |
| | | Total Count | Coliform | Total Count | Coliform |
| A | None | 3,400,000 | 300,000 | 320,000 | 100,000 |
| B | 0.2 | 6,000 | Less than 100 | Less than 100 | Less than 10 |
| C | 0.4 | 4,000 | Less than 100 | Less than 100 | Less than 10 |
| D | 0.8 | 1,000 | Less than 100 | Less than 100 | Less than 10 |
| E | 2.0 | 1,000 | Less than 100 | Less than 100 | Less than 10 |

The standard plate counts indicate that there is a significant destruction of the viable microorganisms occurring within the liquid egg material at the time it is being whipped into a foam. The standard plate counts further indicate that there is over 99% destruction when 0.2% hydrogen peroxide is added to the liquid egg white and that there is 99.99+% destruction of the viable microorganisms after the material is dried. A leveling off of the bactericidal effect of the hydrogen peroxide occurs some place between 0.4 and 0.8% hydrogen peroxide concentration, and a concentration of more than 0.8% is not necessary for substantially complete sterilization of the egg whites. Residual hydrogen peroxide in the dried product was absent for it is dissipated during the drying operation. Angel food cakes that were made from all lots of this example were equivalent in height, texture, and flavor, thereby indicating that the functional properties of the egg albumen or egg white were not impaired by the hydrogen peroxide treatment.

EXAMPLE II

Eight thousand pounds of frozen egg whites were melted in a vat and warmed to 86° F. The batch was desugared by enzymes. The desugared liquid white was then cooled to 40° F. and divided into eight lots of 1,000 pound portions. The hydrogen peroxide was admixed with the cooled liquid egg white and then maintained in a mixing tank for approximately 15 minutes prior to passing the liquid material to the spray dryer. Lots F through I were spray dried without any preheat treatment between the treating vat and the dryer. Lot F was the control and received no hydrogen peroxide treatment. Lots G, H, and I received 0.05%, 0.2%, 0.8%, respectively. Lots J through M were spray dried after preheating to a temperature of 115° F. in a heat exchanger before being transferred to the spray dryer. Lot J was the control. Lots K, L, and M were treated with 0.05%, 0.2%, 0.8%, respectively, of hydrogen peroxide. Retention time likewise was 15 minutes.

*Table II*

| Lot No. | Percent $H_2O_2$ By Weight | Standard Plate Count Per Gram | | | |
|---|---|---|---|---|---|
| | | Of Liquid | | Of Powder | |
| | | Total Count | Coliform | Total Count | Coliform |
| F | None | 750,000 | 40,000 | 120,000 | 13,000 |
| G | 0.05 | 600,000 | 31,500 | 60,000 | 1,000 |
| H | 0.2 | 800,000 | 25,000 | 1,100 | less than 10 |
| I | 0.8 | 580,000 | 45,000 | 350 | less than 10 |
| J | None | 800,000 | 65,000 | 180,000 | 9,800 |
| K | 0.05 | 1,300,000 | 100,000 | 200,000 | 8,000 |
| L | 0.2 | 675,000 | 75,000 | 700 | less than 10 |
| M | 0.8 | 780,000 | 45,000 | 250 | less than 10 |

The standard plate counts indicate that the spray dried material was substantially free of viable microorganisms. Functional properties of the dried egg white were comparable for all lots when tested in angel food cakes.

EXAMPLE III

Five thousand pounds of freshly separated yolks were placed in a vat. Twenty pounds of hydrogen peroxide or 0.4% was admixed with the yolks at a temperature of 60° F. with vigorous agitation over a time period of 60 minutes. After a holding period of one-half hour, the yolks were pumped to a spray dryer and dried. Bacteriological analyses showed the fresh liquid egg yolk had a total count of 900,000 per gram and 100,000 coliform per gram. The dried product had a total plate count of 300 and a coliform count of less than 10 per gram.

EXAMPLE IV

Eight thousand pounds of fresh whole eggs were placed in the vat. The temperature of the eggs was 50° F. Two thousand pounds, as the control (lot A), were dried without hydrogen peroxide or heat treatments. Hydrogen peroxide was added to the balance of the batch or 6000 pounds, with agitation, at the rate of 0.4%. The liquid whole egg had a total count of 750,000 and a coliform count of 90,000 per gram before treating. Three thousand pounds of the treated liquid material was spray dried without heat treatment (lot B). The balance (lot C) of the batch or 3000 pounds was heated in a heat exchanger to a temperature of 140° F. while it was being fed to the spray dryer. Bacteriological analysis of the dried powders showed:

*Table III*

| Lot No. | Standard Plate Count Per Gram of Powder | |
|---|---|---|
| | Total | Coliform |
| A | 100,000 | 50,000 |
| B | 500 | less than 10 |
| C | 250 | less than 10 |

EXAMPLE V

Five thousand pounds of liquid whole eggs was placed in a vat and sugar was added thereto, at an egg temperature of 50° F., at the rate of 10%. A 1,000 pound portion (lot A) was withdrawn and used as the control. To the balance of the sugar-egg mixture (temperature 50° F.) was added hydrogen peroxide at the rate of 0.4%. The treated mixture was held under agitation for a period of 25 minutes after the hydrogen peroxide was added. The balance of 4,000 pounds was then split into two lots (B and C). Lot B was spray dried without any intermediate heat treatment and lot C was preheated to 140° F. and then spray dried. The bacteriological analyses are shown in Table IV.

*Table IV*

| Lot No. | Percent H₂O₂ By Weight | Standard Plate Count Per Gram | | | |
|---|---|---|---|---|---|
| | | Of Liquid | | Of Powder | |
| | | Total Count | Coliform | Total Count | Coliform |
| A | None | 1,500,000 | 300,000 | 850,000 | 120,000 |
| B | 0.4 | 1,400,000 | 300,000 | 300 | less than 10 |
| C | 0.4 | 1,500,000 | 300,000 | 150 | less than 10 |

The bacteriological results of all of the examples show that hydrogen peroxide is an effective bactericidal agent for egg materials when it is used at temperatures below 60° F. and the treated egg material is dried. Such results further indicate that the hydrogen peroxide sterilization technique is a very economical and simple procedure for effectively producing a product that is commercially sterile.

Obviously many modifications and variations of the invention as hereinbefore set forth may be made without departing from the spirit and scope thereof, and therefore only such limitations should be imposed as are indicated in the appended claims.

We claim:

1. The method of preparing substantially sterile dried egg products which comprises: treating liquid egg material with an amount of hydrogen peroxide sufficient to have a bactericidal effect on the bacterial population of said egg material at a temperature below about 60° F.; and thereafter drying said egg material.

2. The method of claim 1 in which the egg material is egg white.

3. The method of claim 1 in which the egg material is egg yolk.

4. The method of claim 1 in which the egg material is whole egg.

5. The method of claim 1 wherein the egg material is dried by spray drying.

6. The method of claim 1 wherein the egg material is dried by foam drying.

7. The method of preparing substantially sterile dried egg products which comprises: treating liquid egg material with at least about 0.05% hydrogen peroxide by weight of the liquid egg material at a temperature ranging from about 30° F. to about 60° F.; and thereafter drying said egg material.

8. The method of preparing substantially sterile dried egg products which comprises: treating liquid egg material with hydrogen peroxide in an amount ranging from about 0.2% to about 0.8% by weight of liquid egg material at a temperature ranging from about 30° F. to about 60° F.; and thereafter drying said egg material.

9. The method of preparing substantially sterile dried egg whites comprising: desugaring liquid egg whites; cooling the desugared whites to a temperature ranging from about 30° F. to about 60° F.; adding at said temperature hydrogen peroxide in an amount ranging from about 0.2% to about 0.8% by weight of liquid egg whites; whipping said whites to a foam; and thereafter drying said foam.

10. The method of preparing substantially sterile dried egg products which comprises: treating liquid egg material containing catalase, at a temperature below about 60° F., with a small amount of hydrogen peroxide sufficient to have a bactericidal effect on the bacterial population of said egg material; and thereafter drying said egg material.

References Cited in the file of this patent

UNITED STATES PATENTS

| 2,200,963 | Mink | May 14, 1940 |
| 2,758,933 | Shaffer | Aug. 14, 1956 |
| 2,776,214 | Lloyd et al. | Jan. 1, 1957 |